United States Patent
Itasaka et al.

(10) Patent No.: US 11,529,946 B2
(45) Date of Patent: Dec. 20, 2022

(54) CONTROL SYSTEM FOR MOVABLE BODY

(71) Applicant: Mazda Motor Corporation, Hiroshima (JP)

(72) Inventors: Naoki Itasaka, Aki-gun (JP); Hirofumi Ebisumoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 188 days.

(21) Appl. No.: 17/150,067

(22) Filed: Jan. 15, 2021

(65) Prior Publication Data

US 2021/0253085 A1 Aug. 19, 2021

(30) Foreign Application Priority Data

Feb. 14, 2020 (JP) .............................. JP2020-023256

(51) Int. Cl.
*B60W 20/40* (2016.01)
*H02P 21/22* (2016.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ........ H02K 7/006; H02K 7/108; F16D 27/14; F02D 41/30; F02B 63/042; B60W 10/02; B60W 10/06; B60W 10/08; B60W 10/10; B60W 20/40; B60W 2510/081; B60W 2510/104

See application file for complete search history.

(56) References Cited

U.S. PATENT DOCUMENTS 4,509,091 A * 4/1985 Booth .................. H01H 47/325
192/3.56
4,567,975 A * 2/1986 Roll ...................... F16D 48/064
192/52.4

(Continued)

FOREIGN PATENT DOCUMENTS

JP 2011200545 A 10/2011
JP 2014231290 A 12/2014

*Primary Examiner* — Carl C Staubach
(74) *Attorney, Agent, or Firm* — Alleman Hall Creasman & Tuttle LLP

(57) ABSTRACT

A control system for a movable body configured to move by utilizing a motor torque generated by a drive motor, is provided. The system includes the drive motor including a rotor configured to output a rotational force and provided with a variable-magnetic-force magnet, and a stator opposing the rotor with a gap therebetween and provided with a plurality of coils, a powertrain component provided so as to be associated with the drive motor, and a controller having a magnetization controlling module configured to control magnetizing current flowing through the coils so as to change a magnetic force of the variable-magnetic-force magnet. During a demagnetization control in which the magnetic force of the variable-magnetic-force magnet is reduced by the magnetization controlling module, the controller operates the powertrain component to suppress a decrease in a moving force applied to the movable body due to a decrease in the motor torque.

17 Claims, 9 Drawing Sheets

(51) Int. Cl.
*B60W 10/02* (2006.01)
*B60W 10/06* (2006.01)
*B60W 10/08* (2006.01)
*B60W 10/10* (2012.01)
*F02B 63/04* (2006.01)
*F02D 41/30* (2006.01)
*F16D 27/14* (2006.01)
*H02K 7/00* (2006.01)
*H02K 7/108* (2006.01)
*H02P 27/12* (2006.01)

(52) U.S. Cl.
CPC ........... *B60W 10/10* (2013.01); *F02B 63/042* (2013.01); *F02D 41/30* (2013.01); *F16D 27/14* (2013.01); *H02K 7/006* (2013.01); *H02K 7/108* (2013.01); *H02P 21/22* (2016.02); *H02P 27/12* (2013.01); *B60W 2510/081* (2013.01); *B60W 2510/104* (2013.01)

(56) References Cited

U.S. PATENT DOCUMENTS

| | | | |
|---|---|---|---|
| 6,886,652 B2* | 5/2005 | Maekawa | B60K 23/0808 180/248 |
| 7,395,888 B2* | 7/2008 | Yamamoto | B60W 10/08 903/907 |
| 11,105,382 B1* | 8/2021 | Itasaka | B60W 20/20 |
| 2010/0090640 A1* | 4/2010 | Maekawa | H02P 21/0089 310/156.03 |
| 2015/0158502 A1* | 6/2015 | Nappo | H02P 21/0089 105/73 |
| 2020/0328632 A1* | 10/2020 | Radford | H02K 1/28 |
| 2021/0036641 A1* | 2/2021 | Itasaka | H02P 21/0089 |
| 2021/0254676 A1* | 8/2021 | Itasaka | B60W 20/40 |

* cited by examiner

CONTROL SYSTEM FOR MOVABLE BODY

TECHNICAL FIELD

The technology disclosed herein relates to a control system for a movable body.

BACKGROUND OF THE DISCLOSURE

In recent years, movable bodies which move by utilizing motor torque generated by a motor, such as electric vehicles and hybrid vehicles, have become popular. For example, JP2014-231290A discloses a hybrid vehicle on which a motor (also used as a generator) and an engine are mounted. This hybrid vehicle is provided with a high-power battery as a power source of the motor, having a rated voltage at several hundreds of volts. The high-power battery is rechargeable by being coupled to a charging stand or a household power source.

Moreover, JP2011-200545A discloses a motor applied to a laundry machine, including a magnet capable of increasing and decreasing its magnetic force. This motor increases the magnetic force of the magnet of a rotor as a demanded load increases.

Meanwhile, the motor used for the movable body is demanded for a wide range of output in terms of both a load direction and a rotational direction, and the demand for the output is high in any of the ranges. In order to achieve the motor characteristics of this wide-range output, the high-voltage battery is generally used like the hybrid vehicle disclosed in JP2014-231290A, or the motor itself is increased in size. However, in either case, the size and weight of equipped components increase, thereby being disadvantageous for the movable body.

In this respect, a magnet able to change its magnetic force according to the load may be used for the rotor similarly to the motor disclosed in JP2011-200545A. Accordingly, a power factor of the motor increases as much as possible, and thus, an increase in the output of the motor can be expected.

However, when the magnetic force of the magnet is reduced, the motor torque temporarily decreases. This decrease in the motor torque may cause uncomfortableness to a person aboard the movable body.

SUMMARY OF THE DISCLOSURE

Therefore, the present disclosure is made in view of addressing the situation described above, and one purpose thereof is to provide a control system for a movable body which moves by utilizing a motor torque generated by a motor. The control system is capable of suppressing uncomfortableness given to a person aboard the movable body as much as possible when reducing a magnetic force of a magnet of the motor.

According to one aspect of the present disclosure, a control system for a movable body configured to move by utilizing a motor torque generated by a drive motor, is provided. The device includes the drive motor including a rotor configured to output a rotational force and provided with a variable-magnetic-force magnet, and a stator opposing the rotor with a gap therebetween and provided with a plurality of coils. The device includes at least one powertrain component provided so as to be associated with the drive motor, and a controller having a processor configured to execute a magnetization controlling module to control magnetizing current flowing through the coils so as to change a magnetic force of the variable-magnetic-force magnet. During a demagnetization control in which the magnetic force of the variable-magnetic-force magnet is reduced by the magnetization controlling module, the controller operates the at least one powertrain component to suppress a decrease in a moving force applied to the movable body due to a decrease in the motor torque.

According to this configuration, when the magnetic force of the magnet is reduced by the demagnetization control, the motor torque decreases accordingly. Here, since the moving force of the movable body is prevented from being decreased by the at least one powertrain component, a person aboard the movable body is not likely to feel discomfort. Therefore, when reducing the magnetic force of the magnet of the motor, the uncomfortableness given to the person aboard the movable body can be suppressed as much as possible.

The at least one powertrain component may include a clutch provided between a transmission of the movable body and the drive motor and configured to connect and disconnect a transmission of the motor torque. The controller may reduce an engaging force of the clutch when performing the demagnetization control, compared to when inhibiting the demagnetization control.

According to this configuration, since the engaging force of the clutch is reduced, even when the motor torque decreases during the demagnetization control, the decrease in the motor torque is unlikely to be transmitted to vehicle wheels. Thus, the uncomfortableness given to the person aboard the movable body during the demagnetization control can be suppressed more effectively.

During the demagnetization control, the controller may cause the magnetization controlling module to supply the magnetizing current to the coils so as to reduce the magnetic force of the variable-magnetic-force magnet after the controller reduces the engaging force of the clutch.

According to this configuration, since the magnetic force of the magnet is reduced after the engaging force of the clutch is reduced, the decrease in the motor torque can be effectively prevented from being transmitted to the wheels. Thus, the uncomfortableness given to the person aboard the movable body during the demagnetization control can be suppressed further effectively.

During the demagnetization control, the controller may supply a torque current to the coils so as to increase the motor torque after the controller reduces the engaging force of the clutch, and cause the magnetization controlling module to supply the magnetizing current to the coils so as to reduce the magnetic force of the variable-magnetic-force magnet.

According to this configuration, since the motor torque is increased in advance, the motor torque after reducing the magnetic force of the magnet can be made closer to the value before the reduction in the magnetic force. Moreover, since the engaging force of the clutch is reduced in advance, the person aboard the movable body is not likely to feel uncomfortable even when the motor torque temporality increases. Therefore, the uncomfortableness given to the person aboard the movable body during the demagnetization control can be suppressed still more effectively.

The controller may supply the torque current to the coils so that a clutch rotational difference becomes below a given value after the controller reduces the magnetic force of the variable-magnetic-force magnet, and restore the engaging force of the clutch immediately before the demagnetization control, the clutch rotational difference being a difference between a rotational speed on a drive motor side of the clutch and a rotational speed on a transmission side of the clutch.

If the clutch rotational difference is large, the person aboard the movable body may feel uncomfortable when the engaging force of the clutch is restored. According to this configuration, since the engaging force of the clutch is restored when the clutch rotational difference is below the given value, the uncomfortableness given to the person aboard the movable body can be suppressed more effectively.

The at least one powertrain component may be configured to adjust a motive force applied to the movable body, the motive force being different from the motive force of the motor torque. During the demagnetization control, the controller may operate the at least one powertrain component to increase the different motive force compared to when inhibiting the demagnetization control.

According to this configuration, by giving the different motive force to the movable body, the decrease in the motor torque can be canceled out even when the motor torque decreases during the demagnetization control. Particularly, since the different motive force is adjusted according to the decreased amount in the motor torque, the moving force of the movable body can be suitably maintained. Therefore, the uncomfortableness given to the person aboard the movable body during the demagnetization control can be suppressed effectively.

The at least one powertrain component may include an alternator coupled to an engine, and during the demagnetization control, the controller may reduce a power-generating load of the alternator to increase the different motive force.

According to this configuration, by reducing the power-generating load of the alternator, the different motive force can be consumed as the moving force of the movable body. Since the alternator is comparatively high in responsiveness, the decrease in the motor torque during the demagnetization control can be canceled out with high responsiveness. Thus, the uncomfortableness given to the person aboard the movable body during the demagnetization control can be suppressed more effectively.

The at least one powertrain component may include the engine, and during the demagnetization control, the controller may increase an amount of fuel injected in the engine so as to increase the different motive force.

According to this configuration, by adjusting the amount of fuel injection in the engine, the engine torque can be appropriately adjusted. Thus, the decrease in the motor torque during the demagnetization control can be canceled out appropriately. As a result, the uncomfortableness given to the person aboard the movable body during the demagnetization control can be suppressed further effectively.

During the demagnetization control, after the controller causes the magnetization controlling module to supply the magnetizing current to the coils so as to reduce the magnetic force of the variable-magnetic-force magnet, the controller may increase torque current supplied to the coils so that the motor torque reaches a target value, as well as increasing the different motive force by the at least one powertrain component according to the decrease in the motor torque due to the decrease in the magnetic force of the variable-magnetic-force magnet, and then, may reduce the different motive force according to the increase in the motor torque due to the increase in the torque current.

That is, in order to maintain the moving force of the movable body so as not to give the uncomfortableness to the person onboard, the different motive force needs to be reduced when the motor torque is increased. Therefore, by adjusting the different motive force by the at least one powertrain component according to the change in the motor torque, the moving force of the movable body can more suitably be maintained. As a result, the uncomfortableness given to the person aboard the movable body during the demagnetization control can be suppressed still more effectively.

DETAILED DESCRIPTION OF THE DISCLOSURE

Hereinafter, exemplary embodiments are described in detail with reference to the accompanying drawings. Note that in the following, directions of "front-and-rear," "left-and-right," and "up-and-down," of an automobile 1 are simply referred to as a "front-and-rear," a "left-and-right," and an "up-and-down," respectively.

Embodiment 1

Movable Body>

Figure 1:
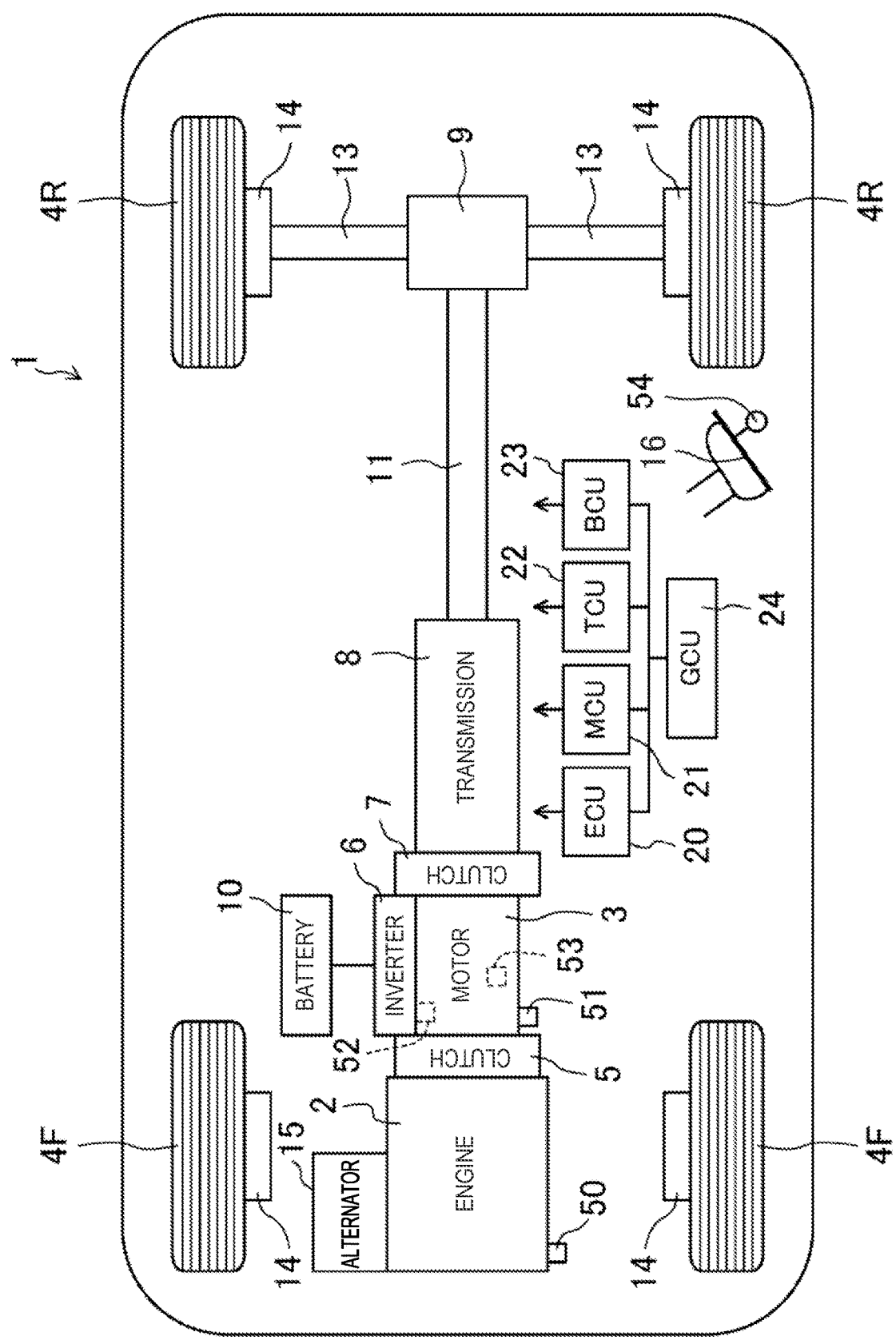
FIG. 1 is a schematic view illustrating a substantial configuration of an automobile controlled by a control system according to Embodiment 1.

FIG. 1 illustrates a four-wheel automobile 1 (one example of the movable body) controlled by a control system according to Embodiment 1. The automobile 1 is provided with an engine 2 and a drive motor 3 as drive sources. These drive sources of the automobile 1 cooperatively drive two wheels (here, rear wheels 4R) disposed symmetrically in the left-and-right direction, among four wheels 4F and 4R. Accordingly, the automobile 1 moves (travels).

The engine 2 of the automobile 1 is disposed on the front side of a vehicle body, and driving wheels are the rear wheels 4R on the rear side of the vehicle body. That is, the automobile 1 is what is called an "FR (front engine, rear-wheel drive) vehicle." Moreover, the main drive source of the automobile 1 is the engine 2 rather than the motor 3, and the motor 3 is used to assist the driving of the engine 2 (what is called a "mild hybrid"). The motor 3 is used not only as the drive source, but also as a generator during regeneration. Note that when a first clutch 5 (described later) is disengaged and a second clutch 7 (described later) is engaged, the automobile 1 is able to travel only by the output of the drive motor 3. The engine 2 is one example of a powertrain component (particularly, a motive-force adjuster) in the present disclosure, which is provided so as to be associated with the drive motor 3.

The automobile 1 is provided with, in addition to the engine 2 and the drive motor 3, the first clutch 5, an inverter 6, the second clutch 7, a transmission 8, a differential gear 9, a battery 10, and an alternator 15 as devices of a drive system. The automobile 1 travels by the operation of the complex of these devices (the drive system).

The automobile 1 also includes a controller 100 as a device of a control system. The controller 100 includes an engine control unit (ECU) 20, a motor control unit (MCU) 21, a transmission control unit (TCU) 22, a brake control unit (BCU) 23, and a general control unit (GCU) 24.

The automobile 1 also includes an engine speed sensor 50, a motor speed sensor 51, a current sensor 52, a magnetic force sensor 53, an accelerator opening sensor 54 as accompanying devices of the control system. Further, the drive motor 3 may be included as an accompanying device of the control system.

The engine 2 is, for example, an internal combustion engine which combusts by using gasoline as fuel. The engine 2 is what is called a "four-cycle engine" in which a rotational force is generated by repeating a cycle consisting of an intake stroke, a compression stroke, an expansion stroke, and an exhaust stroke. The engine 2 may be any of various types including a diesel engine, and the technology disclosed herein does not particularly limit the type of the engine 2.

The engine 2 is disposed longitudinally in an engine bay. That is, the engine 2 is disposed in a center part of the engine room in a vehicle width direction in a state where an output shaft, which outputs the rotational force, is oriented in the front-and-rear direction of the vehicle body. Although the automobile 1 also has various devices and mechanisms accompanying with the engine 2 (e.g., an intake system, an exhaust system, and a fuel supplying system), illustration and description of these components are omitted.

Figure 2:
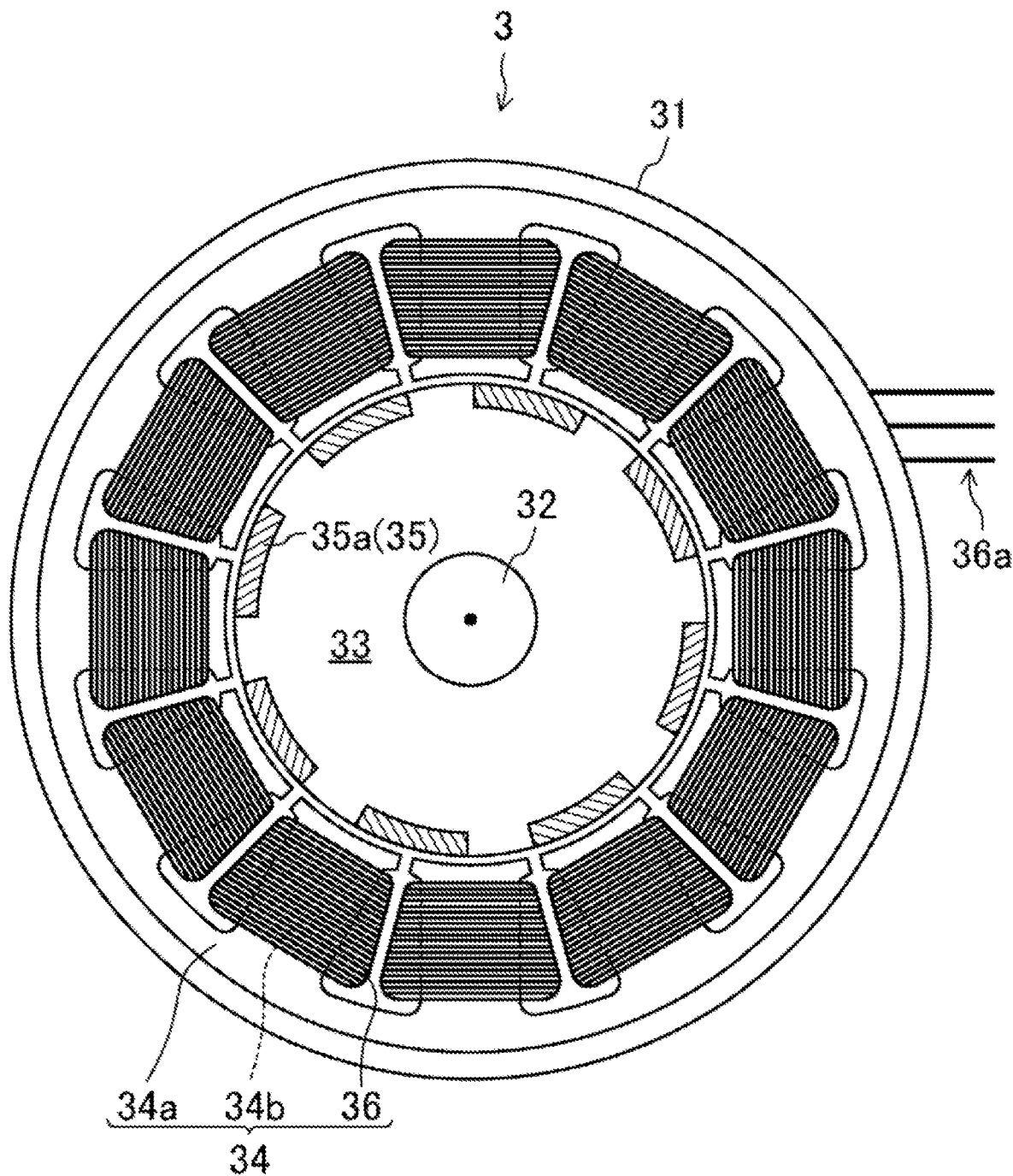
FIG. 2 is a cross-sectional view schematically illustrating a configuration of a drive motor.

The drive motor 3 is serially disposed on the rear side of the engine 2 having the first clutch 5 therebetween. The drive motor 3 is a permanent-magnet synchronous motor driven by three-phase alternating current. As illustrated in FIG. 2, the drive motor 3 is substantially comprised of a motor case 31, a shaft 32, a rotor 33, and a stator 34.

The motor case 31 is comprised of a container having a cylindrical space therein of which a front-end surface and a rear-end surface are sealed, and is fixed to the vehicle body of the automobile 1. The rotor 33 and the stator 34 are accommodated inside the motor case 31. The shaft 32 is rotatably supported by the motor case 31 in a state where a front-end part and a rear-end part thereof are respectively projected from the motor case 31.

The first clutch 5 is disposed between the front-end part of the shaft 32 and the output shaft of the engine 2. The first clutch 5 can switch states between the output shaft being coupled to the shaft 32 (the state where the first clutch 5 is coupled, or an engaged state), and the output shaft being decoupled from the shaft 32 (the state where the first clutch 5 is released, or a disengaged state). Moreover, the first clutch 5 may be in a partially engaged state where an engaging force is slightly smaller than that in the engaged state (a state where the engaging elements slip with each other).

The second clutch 7 is disposed between the rear-end part of the shaft 32 and an input shaft of the transmission 8. The second clutch 7 can switch states between the shaft 32 being engaged with the input shaft of the transmission 8 (an engaged state), and a state the shaft 32 being decoupled from the input shaft of the transmission 8 (a disengaged state). Moreover, the second clutch 7 may be in the partially engaged state where the engaging force is slightly smaller than that in the engaged state (a state the engaging elements slip with each other). The second clutch 7 is one example of the powertrain component in the present disclosure, provided so as to be associated with the drive motor 3.

The rotor 33 is a part of the drive motor 3 which outputs the rotational force. The rotor 33 is a cylindrical member comprised of a plurality of layered metal plates each having a shaft hole at the center. By fixing the intermediate part of the shaft 32 to the shaft holes of the rotor 33, the rotor 33 is integrated with the shaft 32. Therefore, the shaft 32 and the rotor 33 integrally rotate.

A magnet 35 is disposed around the periphery of the rotor 33. The magnet 35 has a plurality of (in FIG. 2, eight) magnetic poles 35a comprised of S-poles and N-poles, which are aligned at the same interval so that the S-pole and the N-pole are aligned alternately in a circumferential direction. The magnet 35 may be comprised of a single cylindrical magnet having the plurality of magnetic poles 35a, or may be comprised of a plurality of arc-shaped magnets which constitute the respective magnetic poles 35a (in FIG. 2, comprised of the plurality of arc-shaped magnets).

In the drive motor 3 of Embodiment 1, the magnet 35 is comprised of a magnet able to change its magnetic force. Normally, a magnet (permanent magnet) with a high coercivity, and able to maintain its magnetic force over a long period of time, is used for this type of drive motor 3. In the drive motor 3 of Embodiment 1, a permanent magnet with a comparatively small coercivity is used as the magnet 35 so that the magnetic force can be changed comparatively easily.

There are various types of permanent magnets used as the magnet 35, which include ferrite magnets, neodymium magnets, samarium cobalt magnets, and Alnico magnets, with different coercivity. The type and material of the magnet 35 are not particularly limited, and may be selectable according to specifications (particularly, according to a range of the used magnetic force).

The stator 34 is disposed cylindrically around the rotor 33 with a slight gap therebetween (an inner-rotor type). The stator 34 has a stator core 34a comprised of a plurality of layered metal plates, and a plurality of coils 36 configured by electrical wires being wound around the stator core 34a.

The stator core 34a is provided with a plurality of teeth 34b projecting radially inwardly, and a plurality of spaces (slots) each formed between adjacent two teeth 34b. The plurality of (in FIG. 2, twelve) coils 36 are formed by the electrical wires being wound around the teeth 34b in a given order (what is called a "concentrated winding"). These coils 36 constitute a three-phase coil group comprised of a U-phase, a V-phase, and a W-phase with different phases of flowing current. The coils with different phases are serially disposed in the circumferential direction.

Note that although in this embodiment the motor 3 has eight poles and twelve slots, it is not limited to this. The motor 3 may have a larger number of poles and slots. For example, the number of the magnetic poles 35a may be "2×N," and the number of slots may be "3×N" (N is an integer) in the motor 3.

In order to supply power to the coils 36, three connection cables 36a are led from the motor case 31. These connection cables 36a are coupled to the battery 10 mounted on the vehicle via the inverter 6. The battery 10 of the automobile 1 is a direct current (DC) battery (low-voltage battery) 10 of which a rated voltage is at or below 50V, in detail, at 48V.

Since the rated voltage of the battery 10 is comparatively low, the battery itself can be reduced in weight and size. Moreover, since advanced measures for preventing electrical shock are unnecessary, an insulation member can also be simplified, for example. Therefore, the battery 10 can be further reduced in the weight and size. Furthermore, since the weight of the automobile 1 can be reduced, fuel consumption and power consumption can be suppressed.

The battery 10 supplies DC power to the inverter 6. The inverter 6 then converts the DC power into the three-phase alternating current so as to supply it to the drive motor 3. Accordingly, an electromagnetic force is generated in each coil 36. An attractive force and a repulsive force acting between the electromagnetic force and the magnetic force of the magnet 35 rotationally drive the rotor 33 so that the rotational force is outputted to the transmission 8 through the shaft 32 and the second clutch 7.

The transmission 8 is a multiple-stage automatic transmission (what is called an "AT"). The transmission 8 has an input shaft at one end part, and an output shaft at the other end part. A plurality of transmission mechanisms, such as planetary gear mechanisms, clutches, and brakes, are incorporated between the input shaft and the output shaft.

By switching the transmission mechanisms of the transmission 8, the automobile 1 can switch the forward and rearward travel, and change the difference in the rotational speed between the input side and the output side. The output shaft of the transmission 8 extends in the vehicle front-and-rear direction, and is coupled to the differential gear 9 via a propeller shaft 11 disposed coaxially with the output shaft.

The differential gear 9 is coupled to a pair of drive shafts 13 extending in the vehicle width direction so as to be coupled to the left-and-right rear wheels 4R, respectively. The motor torque outputted via the propeller shaft 11 is distributed by the differential gear 9 and is transmitted to the driving wheels (rear wheels 4R) via the pair of drive shafts 13, respectively.

Each of the wheels 4F and 4R is provided with a brake 14. The type of this brake 14 is not particularly limited, and may be a disk brake, a drum brake, etc.

The alternator 15 is a generator which generates power by being rotary driven by the engine 2. The alternator 15 is coupled to a crankshaft of the engine 2 via a belt and a pulley (not illustrated). The power generated by the alternator 15 is accumulated in the battery 10.

The alternator 15 can change a power-generating load so as to change an engine torque utilized for the traveling of the automobile 1. In detail, when the power-generating load of the alternator 15 increases, the engine torque utilized for the traveling of the automobile 1 decreases. On the other hand, when the power-generating load of the alternator 15 decreases, the engine torque utilized for the traveling of the automobile 1 increases. The alternator 15 is one example of the powertrain component (particularly, the motive-force adjuster) in the present disclosure, which is provided so as to be associated with the drive motor 3.

<Devices of Control System>

As described above, the automobile 1 is provided with the controller 100 including the ECU 20, the MCU 21, the TCU 22, the BCU 23, and the GCU 24, which controls the traveling of the automobile 1 according to the operation by a driver. Each unit is comprised of hardware, such as a processor 101 (e.g., central processing unit (CPU)), memory, and an interface, and software, such as a database, and a control program. The processor 101 of each unit is configured to execute software modules stored in the memory to perform their respective functions.

The ECU 20 is a unit which mainly controls the operation of the engine 2. The MCU 21 is a unit which mainly controls the operation of the drive motor 3. The TCU 22 is a unit which mainly controls the operation of the transmission 8. The BCU 23 is a unit which mainly controls the operation of the brakes 14. The GCU 24 is a host unit which comprehensively controls the ECU 20, the MCU 21, the TCU 22, and the BCU 23 by electrically being connected therewith.

The engine speed sensor 50 is attached to the engine 2, and detects the rotational speed of the engine 2 so as to output it to the controller 100. The motor speed sensor 51 is attached to the drive motor 3, and detects the rotational speed of the drive motor 3 and a rotational position of the rotor 33 so as to output them to the controller 100. The current sensor 52 is attached to the connection cable 36a, and detects a current value supplied to each coil 36 so as to output it to the controller 100.

The magnetic force sensor 53 is attached to the drive motor 3, and detects the magnetic force of the variable-magnetic-force magnet 35 so as to output it to the controller 100. The accelerator opening sensor 54 is attached to an accelerator pedal 16 which is depressed by the driver when he/she drives the automobile 1, detects an accelerator opening which corresponds to the demanded output for driving the automobile 1, and outputs it to the controller 100.

The controller 100 controls the respective devices of the control system by collaboratively operating the control units based on the signals of the detection values inputted from the sensors, in order to cause the automobile 1 to travel.

Figure 3:
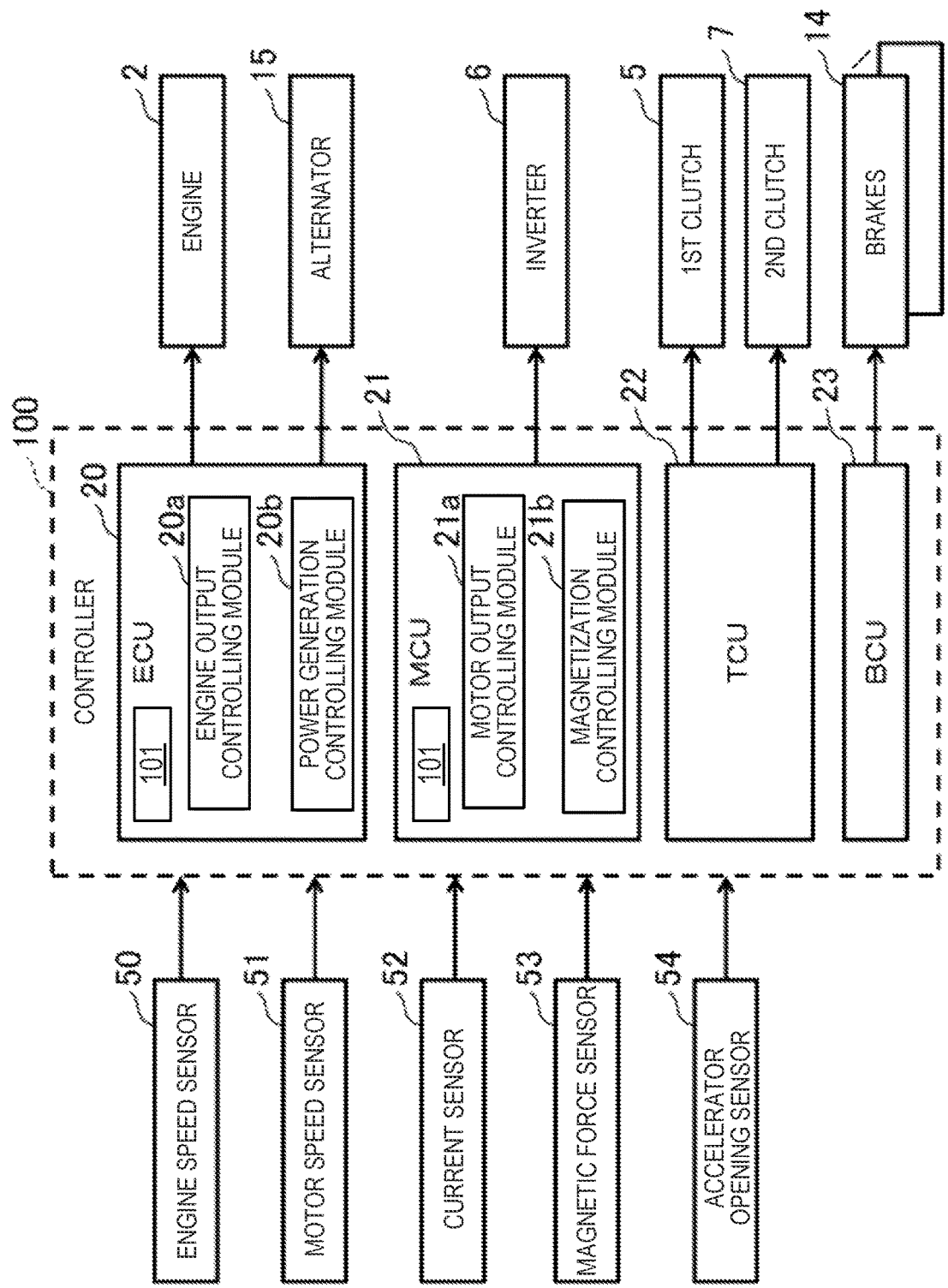
FIG. 3 is a block diagram illustrating a controller of the automobile and main input-and-output devices related to the controller.

As illustrated in FIG. 3, the ECU 20 has an engine output controlling module 20a which adjusts the output of the engine 2. When the automobile 1 travels utilizing the engine torque generated by the engine 2, the engine output controlling module 20a controls the operation of the engine 2 based on the detection values of the accelerator opening sensor 54 and the engine speed sensor 50. In detail, the engine output controlling module 20a adjusts an amount of fuel injected in the engine 2 so that the engine output matches a target engine output calculated based on the detection values of the accelerator opening sensor 54 and the engine speed sensor 50.

The ECU 20 also includes a power generation controlling module 20b which adjusts the power-generating load of the alternator 15. For example, when a remaining amount of the battery 10 is low, the power generation controlling module 20b increases the power-generating load to charge the battery 10. Moreover, when increasing the engine torque utilized for the traveling of the automobile 1, the power-generating load of the alternator 15 is reduced so that the engine torque can be utilized for the traveling of the automobile 1 as much as possible.

The MCU 21 has a motor output controlling module 21a which adjusts the output of the drive motor 3. The motor output controlling module 21a controls torque current (what is called "q-axis current") flowing through the coils 36 to cause the drive motor 3 to output a desired motor output.

The MCU 21 also has a magnetization controlling module 21b which adjusts the magnetic force of the magnet 35. The magnetization controlling module 21b controls magnetizing current (what is called "d-axis current") flowing through the coils 36 to change the magnetic force of the magnet 35. As details will be described later, the magnetization controlling module 21b adjusts the magnetic force of the magnet 35 to increase the power factor of the drive motor 3, which improves an operational efficiency of the drive motor 3.

The TCU 22 controls the engaged and disengaged states of each of the first clutch 5 and the second clutch 7. The BCU 23 controls each brake 14 when braking the automobile 1. During the regenerative brake, the TCU 22 controls the first clutch 5 to be in the disengaged state, and the second clutch 7 to be in the engaged state. Accordingly, the MCU 21 controls the drive motor 3 to generate power so as to be stored in the battery 10.

<Motor Control>

The MCU 21 controls the drive motor 3 so that the automobile 1 travels by utilizing the motor torque of the drive motor 3 while only the drive motor 3 outputs the torque, or the drive motor 3 assists the output by the engine 2.

In detail, the ECU 20 sets the engine torque of the engine 2 based on the detection values of the accelerator opening sensor 54, the engine speed sensor 50, etc. The GCU 24 accordingly sets a demanded amount of motor torque of the drive motor 3 within a given output range, based on a given distribution ratio of the output between the engine 2 and the drive motor 3. The MCU 21 (particularly, the motor output controlling module 21a) controls the drive motor 3 to output the demanded amount of torque.

The magnetization controlling module 21b adjusts the magnetic force of the magnet 35 so as to increase the power factor of the drive motor 3, which improves the operational efficiency of the drive motor 3. In detail, the magnetization controlling module 21b changes the magnetic force of the magnet 35 so that the magnetic force of the magnet 35 substantially matches the electromagnetic force which is generated in the coils 36 by the torque current.

The power factor is a ratio of a real power (power actually consumed) to an apparent power (power supplied to the drive motor 3). That is, when the power factor is small, a larger current needs to be supplied to the coils 36 in order to obtain the same output. Since the current supplied to the coils 36 can be smaller when the power factor is high, it is advantageous for the decrease in the weight and size of the drive motor 3. Moreover, an efficiency of the drive motor 3 to generate power during the regeneration can be improved.

In order to increase the power factor of the drive motor 3, the electromagnetic force generated in the coils 36 needs to substantially match the magnetic force of the permanent magnet (the power factor is substantially "1" when the electromagnetic force substantially matches the magnetic force). In this respect, since a magnetic force of a permanent magnet in a normal permanent-magnet motor is invariable, such a motor uses a permanent magnet with a magnetic force with which the power factor becomes substantially "1" when the motor output is in the most frequently used range.

When the motor is used for a home appliance, since a demanded range of motor output is comparatively limited, such motor characteristics may not be a big problem. However, the movable body such as the automobile 1 is frequently demanded for the motor output in a significantly wide range. Therefore, such motor characteristics require an increase in the voltage of the battery and the increase in size of the motor in order to extend the range where the power factor is high.

In terms of this, Embodiment 1 adopts the variable-magnetic-force magnet so that the magnetization of the magnet 35 can be suitably changed by the magnetization controlling module 21b. Therefore, the magnetization can be changed according to the electromagnetic force generated in the coils 36 so as to improve the power factor.

In detail, the electromagnetic force is comparatively small when the load of the motor is low. At this time, the magnetization controlling module 21b supplies the magnetizing current to the coils 36 so as to reduce the magnetic force of the magnet 35 (hereinafter, referred to as a "demagnetization control"). Therefore, the power factor can be improved in the low-load range.

On the other hand, the electromagnetic force is comparatively large when the load is high. At this time, the magnetization controlling module 21b supplies the magnetizing current to the coils 36 so as to increase the magnetic force of the magnet 35 (hereinafter, referred to as a "magnetization control"). Therefore, the power factor can be improved also in the high-load range.

Figure 4:
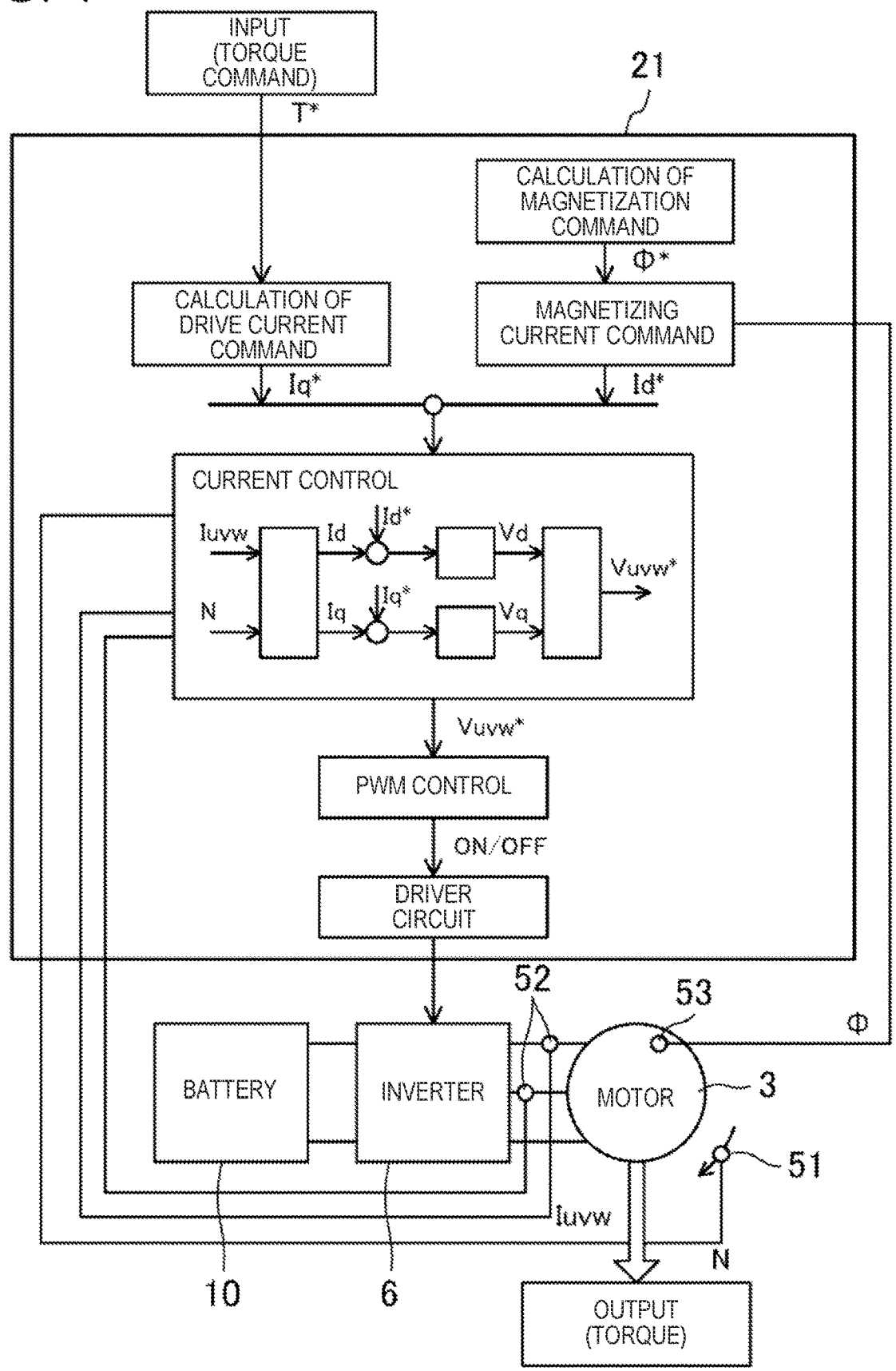
FIG. 4 is a simplified system diagram illustrating a control system of the drive motor.
Figure 5:
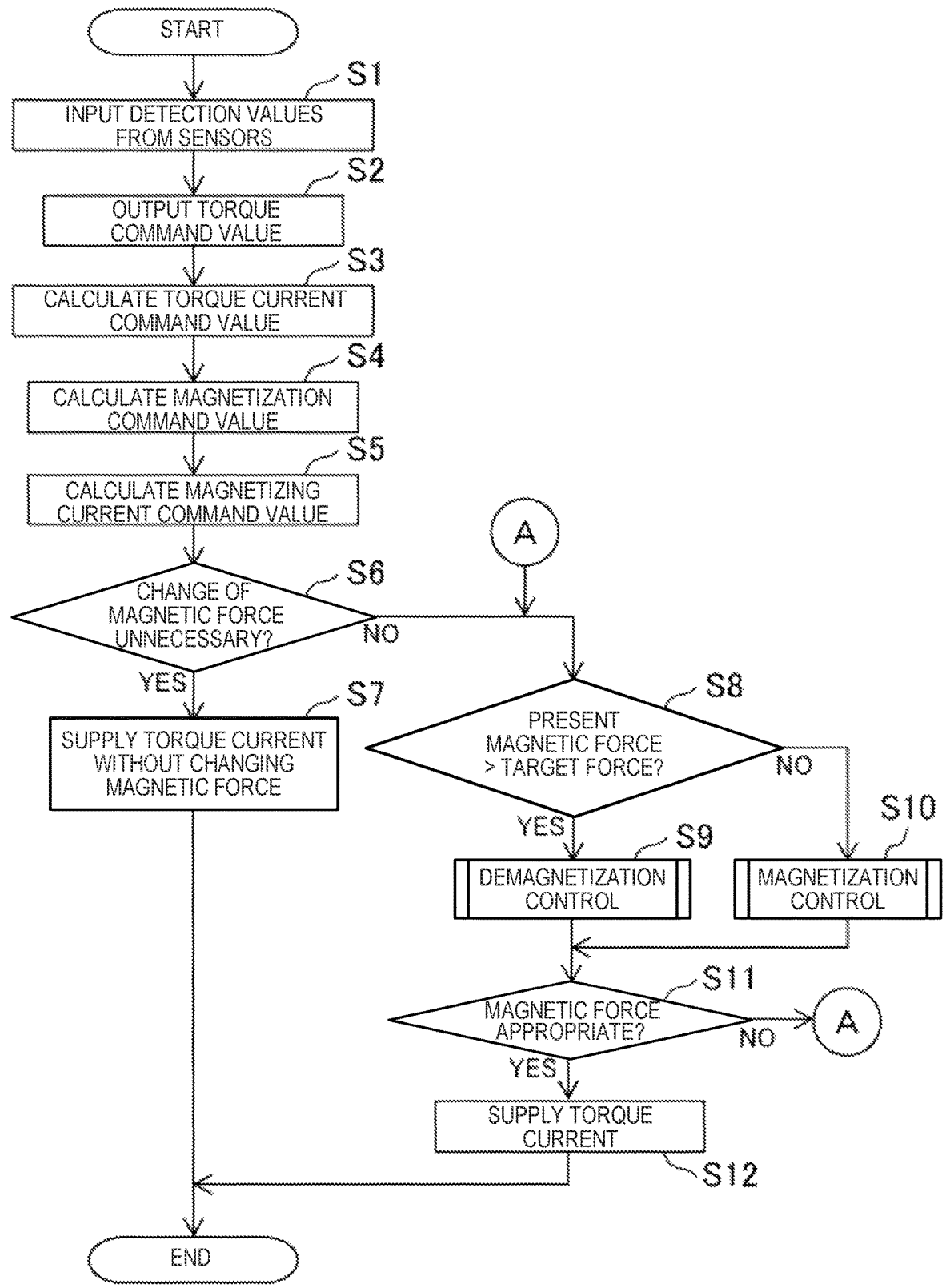
FIG. 5 is a flowchart illustrating processing of the controller during an operational control of the drive motor.

FIG. 4 illustrates a simplified control system of the drive motor 3. Moreover, FIG. 5 illustrates a flowchart during the operational control of the drive motor 3. The detailed flow of controlling the drive motor 3 is described with reference to FIGS. 4 and 5. Note that the drive motor 3 is controlled by vector control using a torque current command Iq* and a magnetizing current command Id*.

When the automobile 1 becomes ready to travel, at Step S1, the control units 20 to 24 of the controller 100 regularly receive input of the detection values from the engine speed sensor 50, the motor speed sensor 51, the current sensor 52, the magnetic force sensor 53, and the accelerator opening sensor 54.

Next, at Step S2, the GCU 24 acquires the detection value of the accelerator opening sensor 54 from the ECU 20 so as to set the demanded amount of motor torque of the drive motor 3 based on the given distribution ratio of the output between the engine 2 and the drive motor 3. Moreover, the GCU 24 outputs a command (a torque command value T*) to the MCU 21 to output the motor torque corresponding to the demanded amount.

Next, at Step S3, when the MCU 21 (the motor output controlling module 21a) receives the input of the torque command value T*, it calculates the command (the torque current command value Iq*) to output an amount of change in the torque current for generating the demanded amount of torque.

Moreover, at Step S4, the MCU 21 (the magnetization controlling module 21b) calculates a command (a magnetization command value Φ*) to output an optimal magnetic force value Φ corresponding to the target output of the drive motor 3.

Next, at Step S5, the magnetization controlling module 21b calculates, based on the magnetization command value Φ*, the command (the magnetizing current command value Id*) to output the magnetizing current corresponding to the change amount of the magnetic force of the magnet 35.

Next, at Step S6, the MCU 21 determines, based on the calculated torque current command value Iq* and the calculated magnetizing current command value Id*, whether changing of the magnetic force of the magnet 35 is necessary. This determination is performed based on, for example, whether a difference more than a given amount occurs between the electromagnetic force of the coils 36 and the magnetic force of the magnet 35 when the target motor torque is outputted.

If the MCU 21 determines that the changing of the magnetic force is unnecessary (Step S6: YES), it shifts to Step S7, where the torque current is supplied based on the calculated torque current command value Iq* without changing the magnetic force. The torque current is supplied by the motor output controlling module 21a calculating the command to execute a pulse width modulation (PWM) control, and controlling the operation of the inverter 6 based on the command.

On the other hand, if the MCU 21 determines that the changing of the magnetic force is necessary (Step S6: NO), it executes a magnetic force changing control. First, at Step S8, the MCU 21 determines whether the present magnetic force is larger than the target magnetic force. If the present magnetic force is larger than the target magnetic force (Step S8: YES), the MCU 21 executes the demagnetization control at Step S9. On the other hand, if the present magnetic force is smaller than the target magnetic force (Step S8: NO), the MCU 21 executes the magnetization control for increasing the magnetic force of the magnet 35 at Step S10. Note that details of the demagnetization control are described later.

After the magnetic force is changed by the demagnetization or magnetization control, the MCU 21 determines at Step S11 whether the changed magnetic force is at an appropriate value, that is, whether the changed magnetic force is at the magnetic force corresponding to the magnetization command value Φ*. If the magnetic force of the magnet 35 is at the appropriate value (Step S11: YES), the MCU 21 shifts to Step S12. On the other hand, if the magnetic force of the magnet 35 is not at the appropriate value (Step S11: NO), the MCU 21 returns to Step S8.

At Step S12, the torque current is supplied based on the calculated torque current command value Iq*. Also at Step S12, the torque current is supplied by the motor output controlling module 21a calculating the command to execute the PWM control, and controlling the operation of the inverter 6 based on the command.

<Control of Second Clutch During Demagnetization Control>

When the demagnetization control for decreasing the magnetic force of the magnet 35 is executed by the magnetization controlling module 21b, the motor torque temporarily decreases. Since the decrease in the motor torque reduces a moving force of the automobile 1, a person aboard the automobile 1 may feel uncomfortable.

Figure 6:
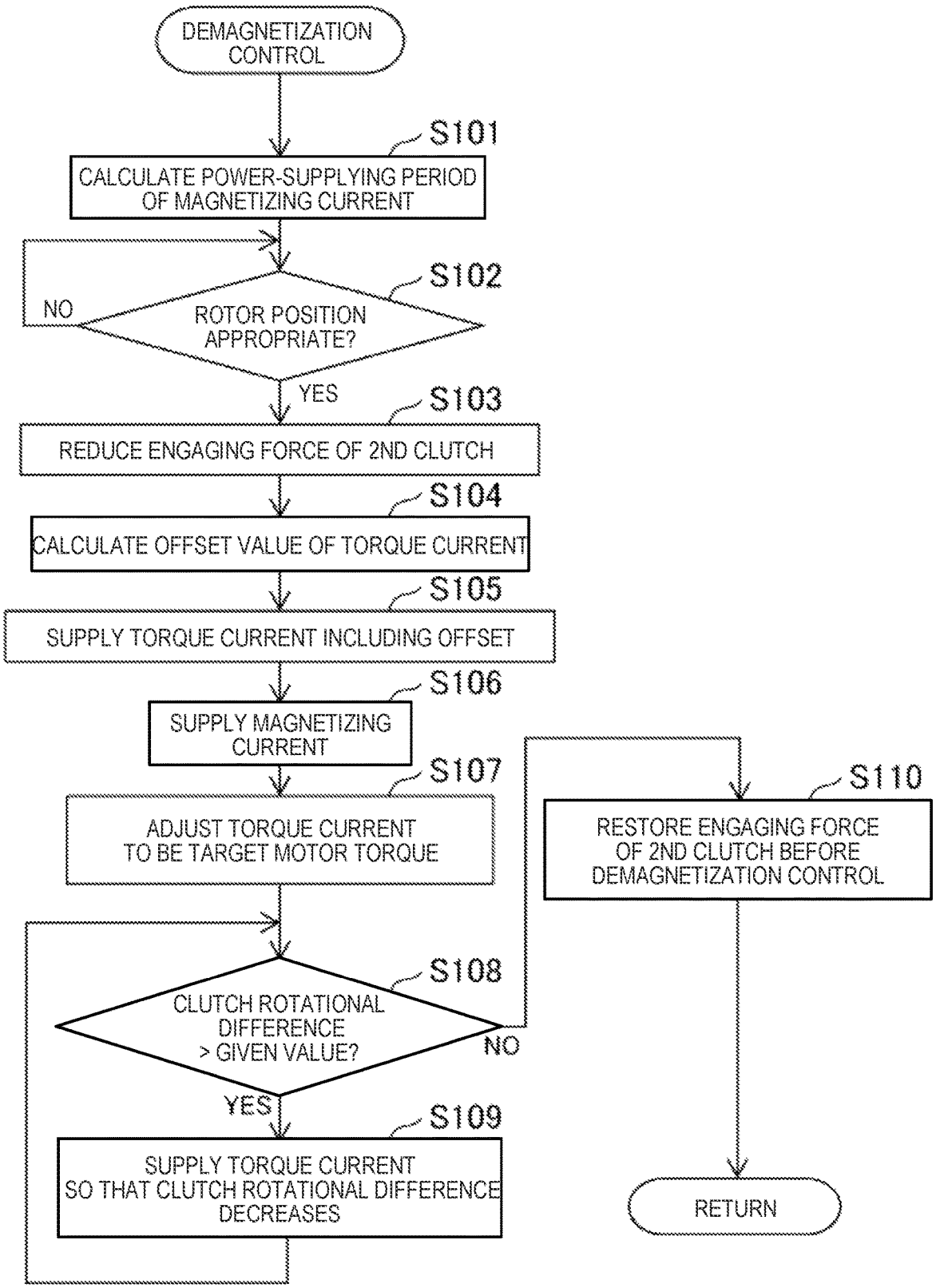
FIG. 6 is a flowchart illustrating processing of the controller during a demagnetization control.

Therefore, in Embodiment 1, the engaged state of the second clutch 7 is suitably controlled so that the uncomfortableness given to the person aboard the automobile 1 during the demagnetization control is suppressed. Below, this control is described in detail with reference to the flowchart in FIG. 6.

First, at Step S101, the MCU 21 calculates a power-supplying period td of the magnetizing current. This power-supplying period td corresponds to a period of time required for the rotor 33 to rotate by an amount of one tooth 34b of the stator 34 at the present rotational speed of the motor. The MCU 21 calculates the power-supplying period based on the following formula. In the following formula, "Pn" is the number of pole pairs of the magnet 35, and "N" is the rotational speed of the rotor 33 per second.

(Power-supplying period)=1/(Pn×3×N)

Next, at Step S102, the MCU 21 determines whether the rotor 33 is at an appropriate position based on the detection result of the motor speed sensor 51. The appropriate position is a position where an axial line of one of the coils 36 of the stator 34 (winding axis) matches with an axial line of one of the magnets 35 (magnetic axis). If the rotor 33 is at the appropriate position (Step S102: YES), the MCU 21 shifts to Step S103. On the other hand, if the rotor 33 is deviated from the appropriate position (Step S102: NO), the MCU 21 repeats the determination at Step S102 until the rotor 33 is located at the appropriate position.

At Step S103, the TCU 22 reduces the engaging force of the second clutch 7. The TCU 22 reduces the engaging force of the second clutch 7 until the second clutch 7 becomes the partially engaged state. Note that the engaging force of the second clutch 7 may be reduced until the second clutch 7 becomes the disengaged state.

Next, at Step S104, the MCU 21 calculates an offset value of the torque current. This offset value is a value with which the motor torque can be larger than the motor torque immediately before the demagnetization control even after the magnetic force of the magnet 35 is reduced (after being set to the optimal magnetic force value Φ).

Next, at Step S105, the MCU 21 supplies the torque current by adding the offset value calculated at Step S104 to the torque current corresponding to the torque current command value Iq*.

Next, at Step S106, the MCU 21 supplies the magnetizing current corresponding to the magnetizing current command value Id*. Thus, the magnetic force of the magnet 35 decreases.

Next, at Step S107, the MCU 21 adjusts the magnitude of the torque current so that the target motor torque, that is, the motor torque corresponding to the torque command value T* is outputted.

Next, at Step S108, the MCU 21 determines whether a clutch rotational difference is above a given value. The clutch rotational difference is a difference between a rotational speed on an upstream side of the second clutch 7 and a rotational speed on a downstream side of the second clutch 7. If the rotational difference is above the given value (Step S108: YES), the MCU 21 shifts to Step S109. On the other hand, if the rotational difference is below the given value (Step S108: NO), the MCU 21 shifts to Step S110. Note that the rotational speed on the upstream side of the second clutch 7 is detected by the motor speed sensor 51. The rotational speed on the downstream side of the second clutch 7 here is a rotational speed of the second clutch 7 at the timing the engaging force of the second clutch 7 is reduced at Step S103.

At Step S109, the MCU 21 supplies the torque current so that the rotational difference between the upstream side and the downstream side of the second clutch 7 becomes below the given value. Since the torque current is supplied by adding the offset value at Step S105, the rotational speed is basically larger on the drive motor 3 side than on the transmission 8 side of the second clutch 7. Thus, the MCU 21 supplies to the coils 36 a current which can apply braking to the rotor 33 so as to reduce the rotational difference between the upstream side and the downstream side of the second clutch 7. After Step S109, the MCU 21 returns to Step 108 to again execute the determination.

On the other hand, at Step S110, the TCU 22 restores the engaging force of the second clutch 7 before the demagnetization control (i.e., the engaged state). After Step S110, the processing returns.

As described above, since the engaging force of the second clutch 7 is reduced before reducing the magnetic force of the magnet 35, the change in the motor torque is difficult to be transmitted to the driving wheels (here, the rear wheels 4R). Therefore, the uncomfortableness given to the person aboard the automobile 1 when changing the magnetic force of the magnet 35 can be suppressed.

Figure 7:
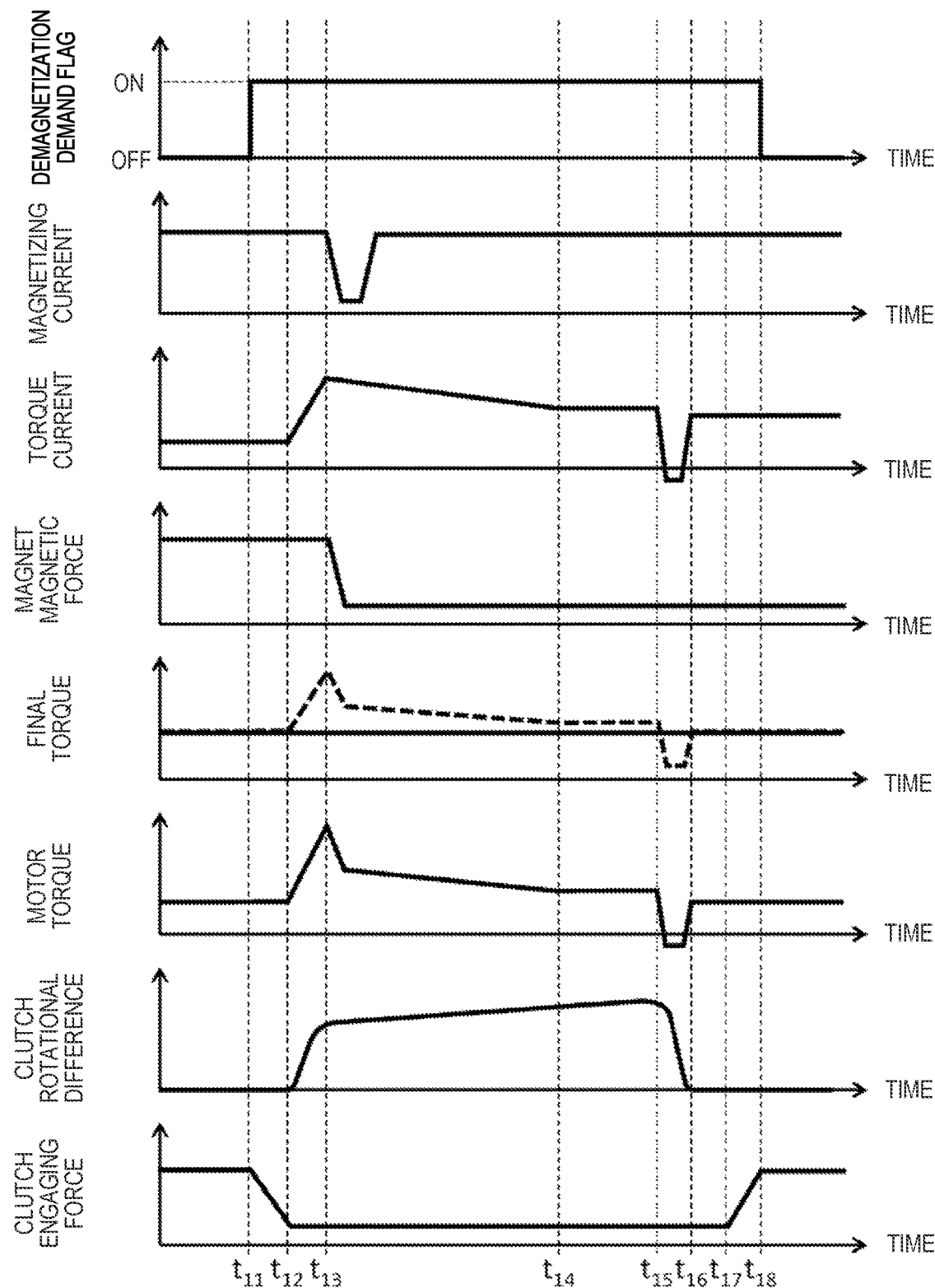
FIG. 7 is a time chart illustrating temporal changes in physical quantities.

FIG. 7 illustrates temporal changes in physical quantities when the MCU 21 (the magnetization controlling module 21b) executes the demagnetization control. In FIG. 7, a final torque means a torque supplied to the driving wheels (here, the rear wheels 4R). In a graph indicating the final torque, a solid line indicates a change when the operation of the second clutch 7 is controlled by the controller 100 according to Embodiment 1, and a broken line indicates a change when the operation of the second clutch 7 is not controlled.

First, it is assumed that a demagnetization demand flag becomes ON at a time t11. At this timing, the TCU 22 reduces the engaging force of the second clutch 7. Meanwhile, the MCU 21 calculates the offset value of the torque current.

When the engaging force of the second clutch 7 decreases (a time t12), the MCU 21 supplies the torque current to the coils 36 by adding the offset value. Accordingly, the motor torque also increases. At this time, the second clutch 7 slips or idles, thus increasing the clutch rotational difference. The rotational speed on the upstream side of the second clutch 7 becomes larger than that on the downstream side.

After the motor torque increases, at a time t13, the MCU 21 supplies the magnetizing current to the coils 36 so as to reduce the magnetic force of the magnet 35. Therefore, the magnetic force of the magnet 35 decreases, and accordingly, the motor torque also decreases. Note that although the motor torque slightly increases by a reactance torque generated at the moment the magnetizing current is supplied, illustration is omitted in FIG. 7 since it hardly affects the final torque.

Next, the MCU 21 gradually reduces the torque current so that the motor torque becomes the target motor torque. After the motor torque approaches the target motor torque at a time t14, the MCU 21 supplies a constant torque current until a time t15. Also during this period, since the engaging force of the second clutch 7 is still small, the clutch rotational difference is large.

Then, at the time t15, the MCU 21 supplies the torque current to the coils 36 so that the clutch rotational difference becomes below the given value, in detail, becomes substantially zero. At this time, the MCU 21 supplies the torque current which reduces the rotational speed of the rotor 33. Therefore, the motor torque temporarily decreases so as to reduce the rotational speed on the upstream side of the second clutch 7. As a result, the clutch rotational difference decreases.

After the clutch rotational difference decreases, the MCU 21 restores the torque current so that the motor torque becomes the target motor torque (a time t16). Accordingly, the motor torque also restores the torque before the decrease. After the clutch rotational difference becomes substantially zero (a time t17), the TCU 22 restores the engaging force of the second clutch 7 to that immediately before the demagnetization control. Then, at a time t18, the demagnetization demand flag becomes OFF, and the demagnetization control ends.

As indicated by the broken line in FIG. 7, if the second clutch 7 is maintained to be engaged, the change in the motor torque is transmitted to the driving wheels as it is. Therefore, the change in the motor torque is transmitted to the person aboard the automobile 1 as a change in an acceleration. On the other hand, when the engaging force of the second clutch 7 is reduced in advance as Embodiment 1, the change in the motor torque is difficult to be transmitted to the driving wheels. Therefore, the final torque hardly changes and is maintained to be constant. Thus, the uncomfortableness given to the person aboard the automobile 1 during the demagnetization control can be suppressed.

Therefore, in Embodiment 1, the controller 100 reduces the engaging force of the second clutch 7 during the demagnetization control compared to when the demagnetization control is not executed (inhibited). Thus, the decrease in the motor torque is difficult to be transmitted to the driving wheels even when the motor torque decreases during the demagnetization control. Accordingly, the uncomfortableness given to the person aboard the automobile 1 during the demagnetization control can be suppressed.

Particularly, in Embodiment 1, the controller 100 causes, during the demagnetizing control, the magnetization controlling module 21b to supply the magnetizing current to the coils 36 so as to reduce the magnetic force of the magnet 35 after reducing the engaging force of the second clutch 7. Therefore, it is effectively prevented that the decrease in the motor torque is transmitted to the driving wheels. Thus, the uncomfortableness given to the person aboard the automobile 1 during the demagnetization control can be suppressed more effectively.

Moreover, in Embodiment 1, the controller 100 supplies, during the demagnetization control, the torque current to the coils 36 so as to increase the motor torque after reducing the engaging force of the second clutch 7, and then, causes the magnetization controlling module 21b to supply the magnetizing current to the coils 36 so as to reduce the magnetic force of the magnet 35. Since the motor torque is increased in advance, the motor torque after reducing the magnetic force of the magnet 35 can be made closer to that before the reduction in the magnetic force. Moreover, since the engaging force of the second clutch 7 is reduced in advance, the person aboard the automobile 1 is not likely to feel uncomfortable even when the motor torque temporality increases. Therefore, the uncomfortableness given to the person aboard the automobile 1 during the demagnetization control can be suppressed further effectively.

Moreover, in Embodiment 1, the controller 100 supplies the torque current to the coils 36 so that the clutch rotational difference, which is the difference between the rotational speed on the drive motor 3 side of the second clutch 7 and the rotational speed on the transmission 8 side of the second clutch 7, becomes below the given value after reducing the magnetic force of the magnet 35. Then, the controller 100 restores the engaging force of the second clutch 7 immediately before the demagnetization control. If the clutch rotational difference is large, the person aboard the automobile 1 may feel uncomfortable when the engaging force of the second clutch 7 is restored. Thus, by restoring the engaging force of the second clutch 7 when the clutch rotational difference is below the given value, the uncomfortableness given to the person aboard the automobile 1 can be suppressed more effectively.

Embodiment 2

Below, Embodiment 2 is described in detail with reference to the drawings. Note that, in the description below, detailed description of parts common with Embodiment 1 is omitted by giving the same reference characters.

Embodiment 2 is different from Embodiment 1 in that, during the demagnetization control for reducing the magnetic force of the magnet 35 by the magnetization controlling module 21b, the change in the motor torque is absorbed by controlling the engine torque but not the second clutch 7. In detail, the ECU 20 controls at least one of the engine 2 and the alternator 15 so that the engine torque increases according to the decrease in the motor torque.

Figure 8:
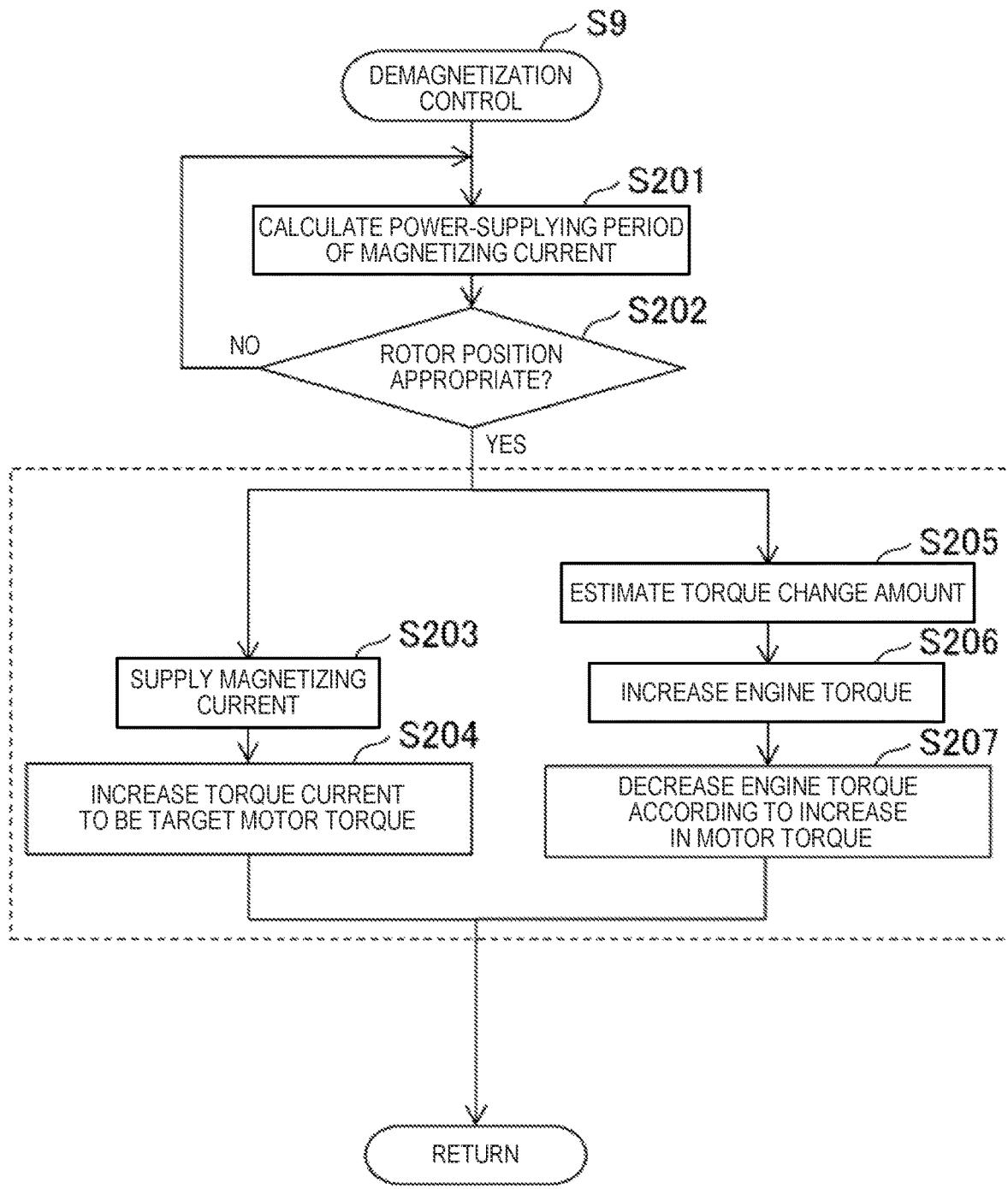
FIG. 8 is a flowchart illustrating processing of a controller during a demagnetization control according to Embodiment 2.

FIG. 8 is a flowchart illustrating processing of the controller 100 during the demagnetization control in Embodiment 2. Below, the control executed by the controller 100 is described with reference to FIG. 8. Note that the "engine torque" as used herein refers to an amount of engine torque used for moving the automobile 1.

First, at Step S201, the MCU 21 calculates the power-supplying period td of the magnetizing current. This power-supplying period td corresponds to the period of time required for the rotor 33 to rotate by an amount of one tooth 34b of the stator 34 in the present rotational speed of the motor.

Next, at Step S202, the MCU 21 determines whether the rotor 33 is at the appropriate position based on the detection result of the motor speed sensor 51. If the rotor 33 is at the appropriate position (Step S202: YES), the MCU 21 shifts to the next step. On the other hand, if the rotor 33 is deviated from the appropriate position (Step S202: NO), the MCU 21 repeats the determination at Step S202 until the rotor 33 is located at the appropriate position.

If the determination at Step S202 is YES, the MCU 21 executes processing at Steps S203 and S204, and in parallel with this, the ECU 20 executes processing at Steps S205 to S207.

At Step S203, the MCU 21 supplies the magnetizing current corresponding to the magnetizing current command value Id*. Thus, the magnetic force of the magnet 35 decreases.

At Step S204, the MCU 21 increases the torque current so as to output the target motor torque, that is, the motor torque corresponding to the torque command value T*.

Meanwhile, at Step S205, the ECU 20 estimates the motor torque which is reduced due to the decrease in the magnetic force of the magnet 35. Here, the ECU 20 estimates the reduced motor torque, for example, based on information on the target magnetic force acquired from the MCU 21, and the current value presently supplied to the coils, which is inputted from the current sensor 52.

At Step S206, the ECU 20 increases the engine torque. For example, the ECU 20 reduces the power-generating load of the alternator 15 by the power generation controlling module 20b so as to increase the engine torque supplied to the driving wheels. Alternatively, the engine output controlling module 20a may increase the engine torque by increasing the amount of fuel injection in the engine 2. Alternatively, both the adjustment of the power-generating load of the alternator 15 and the adjustment of the amount of fuel injection may be executed.

At Step S207, the ECU 20 reduces the engine torque according to the increase in the motor torque at S204. After Steps S204 and S207, the processing returns.

As described above, by increasing the engine torque according to the decrease in the motor torque, the change in the motor torque can be canceled out by the engine torque. Therefore, the change in the motor torque is difficult to be transmitted to the driving wheels (here, the rear wheels 4R). Accordingly, the uncomfortableness given to the person aboard the automobile 1 when changing the magnetic force of the magnet 35 can be suppressed.

Figure 9:
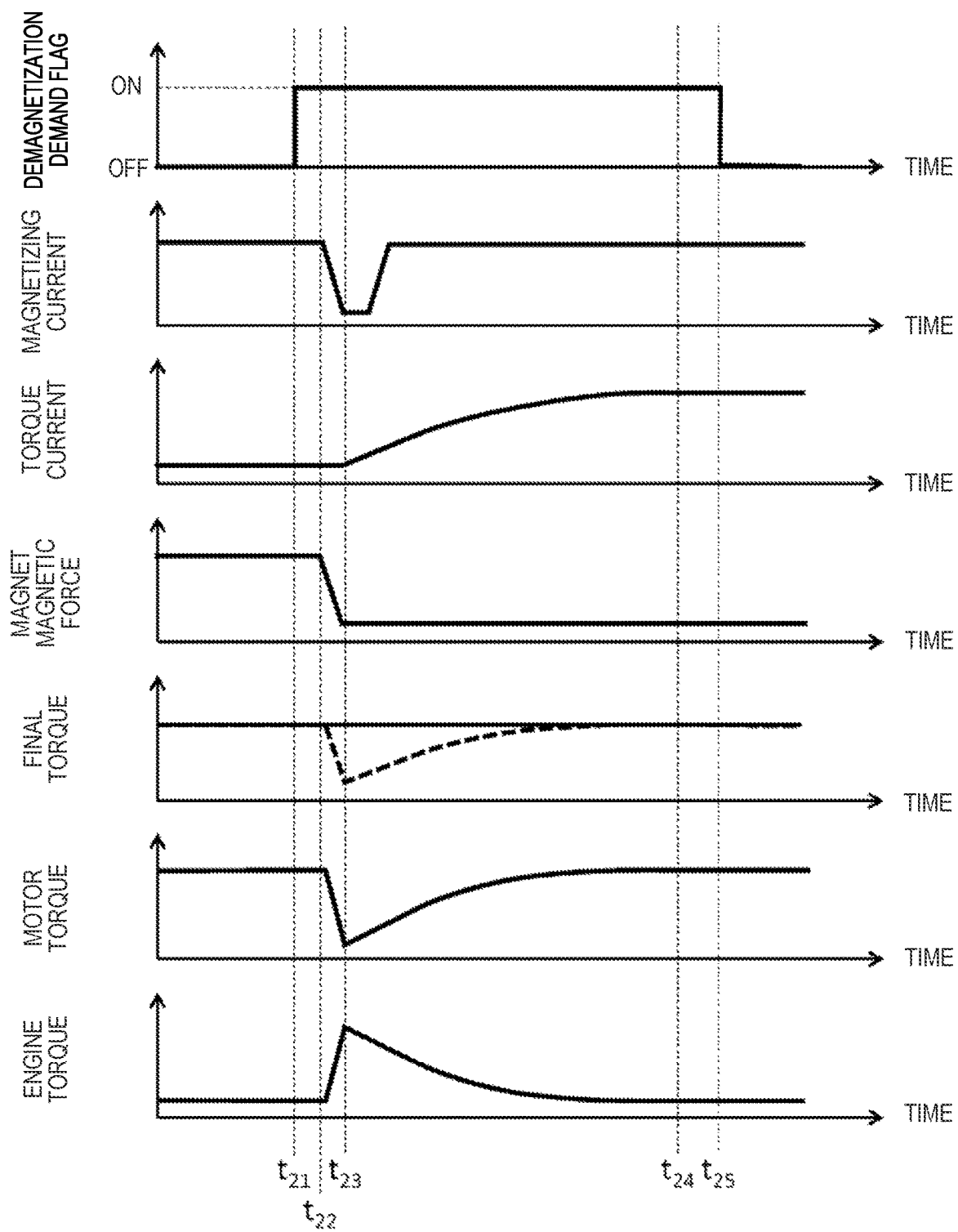
FIG. 9 is a time chart illustrating temporal changes in physical quantities according to Embodiment 2.

FIG. 9 illustrates temporal changes in physical quantities when the MCU 21 executes the demagnetization control. In FIG. 9, the final torque means a torque supplied to the driving wheels (here, the rear wheels 4R). In a graph indicating the final torque, a solid line indicates a change when the engine torque is adjusted by the controller 100 (controller) according to Embodiment 2, and a broken line indicates a change when the engine torque is not adjusted.

First, it is assumed that the demagnetization demand flag becomes ON at a time t21. After the demagnetization demand flag becomes ON, at a time t22, the MCU 21 supplies the magnetizing current to the coils 36 so as to reduce the magnetic force of the magnet 35. Therefore, the magnetic force of the magnet 35 decreases, and accordingly, the motor torque decreases. According to this decrease in the motor torque, at the time t22, the ECU 20 controls at least one of the engine 2 and the alternator 15 so as to increase the engine torque. Note that although the motor torque slightly increases by the reactance torque generated at the moment the magnetizing current is supplied, illustration is omitted in FIG. 9 since it hardly affects the final torque.

When the motor torque decreases at a time t23, the MCU 21 gradually increases the torque current so that the motor torque becomes the target motor torque. Therefore, the motor torque gradually increases. According to this gradual increase in the motor torque, the ECU 20 controls the engine 2 or the alternator 15 to gradually reduce the engine torque.

Then, when the motor torque becomes the target motor torque (a time t24), the demagnetization demand flag becomes OFF at a time t25, and the demagnetization control ends.

As indicated by the broken line in FIG. 9, if the engine torque is not adjusted, the change in the motor torque is transmitted to the driving wheels as it is, and the change in the motor torque is transmitted to the person aboard the automobile 1 as the change in the acceleration. On the other hand, when the engine torque is adjusted to cancel out the change in the motor torque as Embodiment 2, the change in the motor torque is difficult to be transmitted to the driving wheels. Therefore, the final torque hardly changes and is maintained to be constant. Thus, the uncomfortableness given to the person aboard the automobile 1 during the demagnetization control can be suppressed.

Note that when increasing the torque current to output the target motor torque, the torque current may overshoot and the motor torque larger than the target motor torque may be generated. In this case, for example, the brakes 14 may be operated so as to cancel out the overshot amount of the motor torque by a braking force of the brakes 14. Alternatively, the power-generating load of the alternator 15 may be increased so as to reduce the engine torque utilized for the moving force of the automobile 1.

Therefore, in Embodiment 2, the controller 100 operates the motive-force adjuster (e.g., the engine 2 and the alternator 15) so as to increase the engine torque during the demagnetization control. Thus, the decrease in the motor torque can be canceled out by the engine torque even when the motor torque decreases during the demagnetization control, and the uncomfortableness given to the person aboard the movable body during the demagnetization control can be effectively suppressed.

Particularly, since in Embodiment 2 the engine torque is adjusted according to the change in the motor torque, the torque supplied to the driving wheels of the automobile 1 can be suitably maintained. Therefore, the uncomfortableness given to the person aboard the movable body during the demagnetization control can be suppressed further more effectively.

Other Embodiments

The technology disclosed herein is not limited to the embodiments described above, and may be substituted without departing from the spirit of the appended claims.

For example, although in Embodiment 1 the movable body is the hybrid vehicle as one example, it may be an electric vehicle which is driven only by a drive motor. Moreover, Embodiment 2 may be applied to a two-wheel vehicle (e.g., a motorcycle) as long as it is a movable body having a drive motor and another drive source, such as the engine 2.

The embodiments described above are merely illustration, and should not be interpreted to limit the scope of the present disclosure. The scope of the present disclosure is defined by the appended claims, and all modifications and changes which fall within the range of equivalence of the claims are intended to be embraced within the present disclosure.

The technology disclosed herein is useful as a control system for a movable body which is provided with a motor, and is movable by utilizing a motor torque generated by the motor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile (Movable Body)
2 Engine (Powertrain Component)
3 Drive Motor
7 Second Clutch (Powertrain Component)
15 Alternator (Powertrain Component)
33 Rotor
34 Stator
35 Variable-magnetic-force Magnet
36 Coil
100 Controller

What is claimed is:

1. A control system for a movable body configured to move by utilizing a motor torque generated by a drive motor, comprising:
    the drive motor, including:
        a rotor configured to output a rotational force and provided with a variable-magnetic-force magnet; and
        a stator opposing the rotor with a gap therebetween and provided with a plurality of coils;
    at least one powertrain component provided so as to be associated with the drive motor; and
    a controller having a processor configured to execute a magnetization controlling module to control a magnetizing current flowing through the coils so as to change a magnetic force of the variable-magnetic-force magnet,
    wherein, during a demagnetization control in which the magnetic force of the variable-magnetic-force magnet is reduced by the magnetization controlling module, the controller operates the at least one powertrain component to suppress a decrease in a moving force applied to the movable body due to a decrease in the motor torque.

2. The control system of claim 1,
    wherein the at least one powertrain component includes a clutch provided between a transmission of the movable body and the drive motor and configured to connect and disconnect a transmission of the motor torque, and
    wherein the controller reduces an engaging force of the clutch when performing the demagnetization control, compared to when inhibiting the demagnetization control.

3. The control system of claim 2, wherein during the demagnetization control, the controller causes the magnetization controlling module to supply the magnetizing current to the coils so as to reduce the magnetic force of the variable-magnetic-force magnet after the controller reduces the engaging force of the clutch.

4. The control system of claim 3, wherein during the demagnetization control, the controller supplies a torque current to the coils so as to increase the motor torque after the controller reduces the engaging force of the clutch, and causes the magnetization controlling module to supply the magnetizing current to the coils so as to reduce the magnetic force of the variable-magnetic-force magnet.

5. The control system of claim 4, wherein the controller supplies the torque current to the coils so that a clutch rotational difference becomes below a given value after the controller reduces the magnetic force of the variable-magnetic-force magnet, and restores the engaging force of the clutch immediately before the demagnetization control, the clutch rotational difference being a difference between a rotational speed on a drive motor side of the clutch and a rotational speed on a transmission side of the clutch.

6. The control system of claim 1,
    wherein the at least one powertrain component is configured to adjust a motive force applied to the movable body, the motive force being different from the motive force of the motor torque, and
    wherein, during the demagnetization control, the controller operates the at least one powertrain component to increase the different motive force compared to when inhibiting the demagnetization control.

7. The control system of claim 6,
    wherein the at least one powertrain component includes an alternator coupled to an engine, and
    wherein, during the demagnetization control, the controller reduces a power-generating load of the alternator to increase the different motive force.

8. The control system of claim 7,
    wherein the at least one powertrain component includes the engine, and
    wherein, during the demagnetization control, the controller increases an amount of fuel injected in the engine so as to increase the different motive force.

9. The control system of claim 8, wherein during the demagnetization control, after the controller causes the magnetization controlling module to supply the magnetizing current to the coils so as to reduce the magnetic force of the variable-magnetic-force magnet, the controller increases the torque current supplied to the coils so that the motor torque reaches a target value, as well as increasing the different motive force by the at least one powertrain component according to the decrease in the motor torque due to the decrease in the magnetic force of the variable-magnetic-force magnet, and then, reduces the different motive force according to the increase in the motor torque due to the increase in the torque current.

10. The control system of claim 2, wherein during the demagnetization control, the controller supplies a torque current to the coils so as to increase the motor torque after the controller reduces the engaging force of the clutch, and causes the magnetization controlling module to supply the magnetizing current to the coils so as to reduce the magnetic force of the variable-magnetic-force magnet.

11. The control system of claim 2, wherein the controller supplies a torque current to the coils so that a clutch rotational difference becomes below a given value after the controller reduces the magnetic force of the variable-magnetic-force magnet, and restores the engaging force of the clutch immediately before the demagnetization control, the clutch rotational difference being a difference between a rotational speed on a drive motor side of the clutch and a rotational speed on a transmission side of the clutch.

12. The control system of claim 3, wherein the controller supplies a torque current to the coils so that a clutch rotational difference becomes below a given value after the controller reduces the magnetic force of the variable-magnetic-force magnet, and restores the engaging force of the clutch immediately before the demagnetization control, the clutch rotational difference being a difference between a rotational speed on a drive motor side of the clutch and a rotational speed on a transmission side of the clutch.

13. The control system of claim 6, wherein the at least one powertrain component includes an engine, and
wherein, during the demagnetization control, the controller increases an amount of fuel injected in the engine so as to increase the different motive force.

14. The control system of claim 6, wherein during the demagnetization control, after the controller causes the magnetization controlling module to supply the magnetizing current to the coils so as to reduce the magnetic force of the variable-magnetic-force magnet, the controller increases torque current supplied to the coils so that the motor torque reaches a target value, as well as increasing the different motive force by the at least one powertrain component according to the decrease in the motor torque due to the decrease in the magnetic force of the variable-magnetic-force magnet, and then, reduces the different motive force according to the increase in the motor torque due to the increase in the torque current.

15. The control system of claim 7, wherein during the demagnetization control, after the controller causes the magnetization controlling module to supply the magnetizing current to the coils so as to reduce the magnetic force of the variable-magnetic-force magnet, the controller increases torque current supplied to the coils so that the motor torque reaches a target value, as well as increasing the different motive force by the at least one powertrain component according to the decrease in the motor torque due to the decrease in the magnetic force of the variable-magnetic-force magnet, and then, reduces the different motive force according to the increase in the motor torque due to the increase in the torque current.

16. The control system of claim 10, wherein the controller supplies the torque current to the coils so that a clutch rotational difference becomes below a given value after the controller reduces the magnetic force of the variable-magnetic-force magnet, and restores the engaging force of the clutch immediately before the demagnetization control, the clutch rotational difference being a difference between a rotational speed on a drive motor side of the clutch and a rotational speed on a transmission side of the clutch.

17. The control system of claim 13, wherein during the demagnetization control, after the controller causes the magnetization controlling module to supply the magnetizing current to the coils so as to reduce the magnetic force of the variable-magnetic-force magnet, the controller increases torque current supplied to the coils so that the motor torque reaches a target value, as well as increasing the different motive force by the at least one powertrain component according to the decrease in the motor torque due to the decrease in the magnetic force of the variable-magnetic-force magnet, and then, reduces the different motive force according to the increase in the motor torque due to the increase in the torque current.

* * * * *